Sept. 28, 1943.  J. ZUCKER  2,330,655
PLANT FOR RECOVERY OF VOLATILE OIL AND GREASE SOLVENTS
Filed March 23, 1942

Inventor
Jacques Zucker
by Singer, Ehlert, Skrow & Carlberg
Attorneys

Patented Sept. 28, 1943

2,330,655

UNITED STATES PATENT OFFICE 2,330,655

PLANT FOR RECOVERY OF VOLATILE OIL AND GREASE SOLVENTS

Jacques Zucker, Zurich, Switzerland

Application March 23, 1942, Serial No. 435,772
In Switzerland January 17, 1941

3 Claims. (Cl. 202—168)

The invention relates to a new and improved plant for the recovery of volatile oil and grease solvents. It is known to degrease metal articles and other nonabsorbent materials by subjecting them to the action of volatile organic solvents, such as carbon tetrachloride, benzine, benzol, trichlorethylene and so on. In the devices for cleansing the oily and greasy metal articles the solvent is commonly heated and vapors of the solvent are evolved in considerable volume.

The main object of the invention consists in the provision of a plant to prevent the loss of solvent by evaporation and moreover to prevent escape of these vapors to the atmosphere as the vapors are injurious if breathed.

The instant invention is directed more particularly to the provision of a simple efficient and compact plant for recovering the vapors of said degreasing solvents with increased economy.

Further objects and advantages of my invention will appear from the following specification.

In the accompanying drawing a plant is illustrated in a diagrammatical manner.

Figure 1:
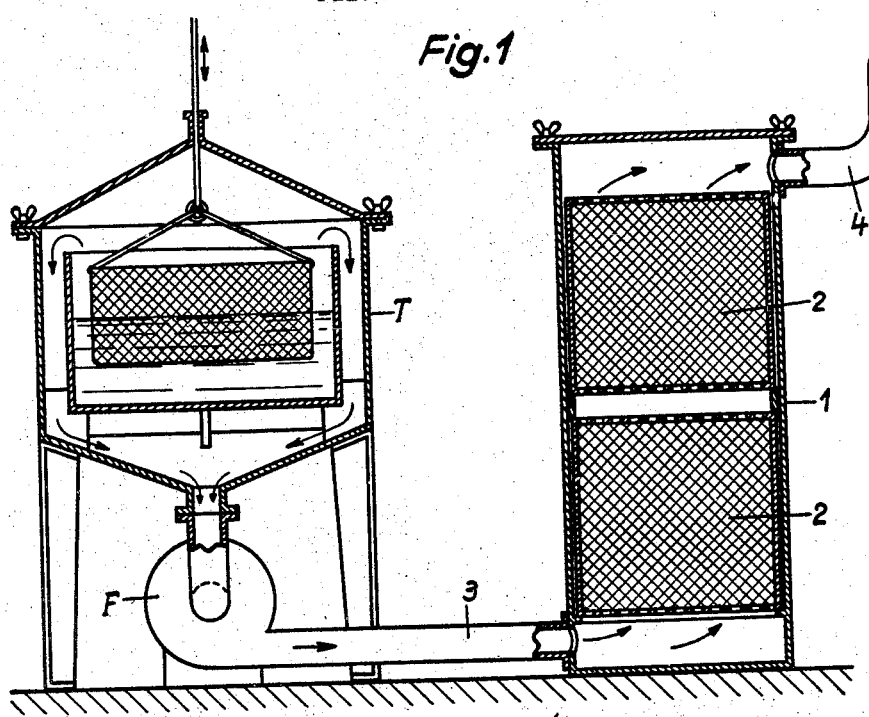
Fig. 1 is a sectional elevation of a compartment to collect the vapors escaping from a degreasing apparatus.
Figure 2:
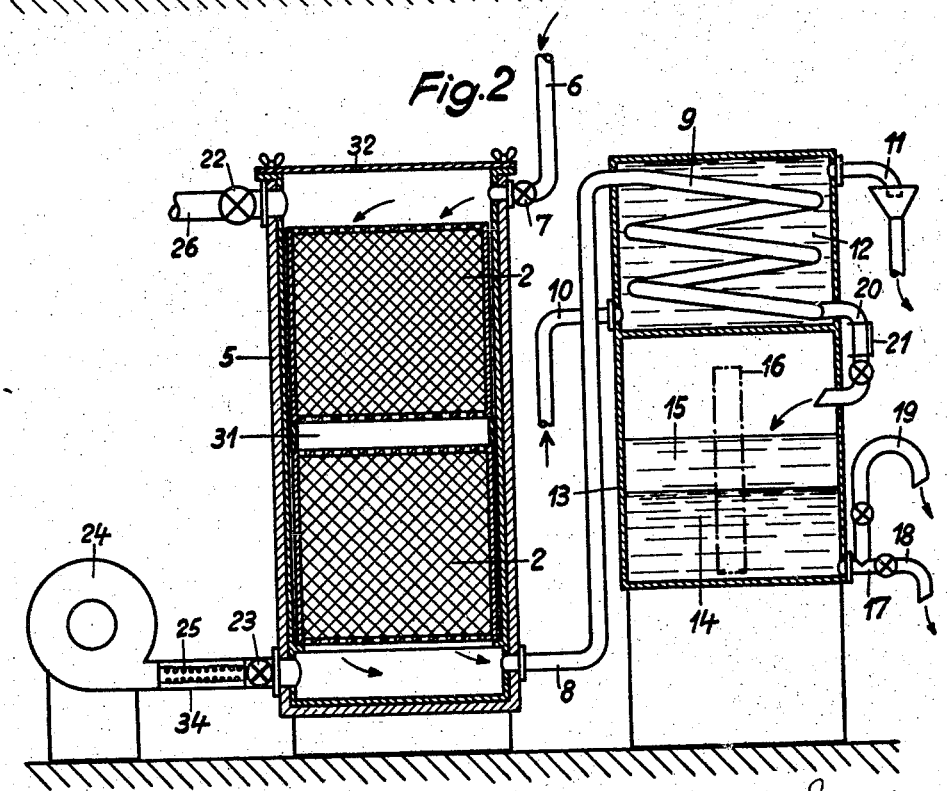
Fig. 2 is a sectional elevation of a device to recover the collected degreasing solvent.

In the apparatus shown 1 denotes a chamber adapted to receive containers 2 and connected by a conduit 3 with the discharge socket of a centrifugal suction fan F the intake of which being connected with the tank T for the articles to be degreased and for the volatile solvent. The chamber 1 is closed by a lid for the insertion and removal of the containers 2. From the upper end of chamber 1 extends an outlet conduit 4. The containers 2 are baskets filled with a suitable material of a character which readily absorbs the solvent vapors such as coal. The air free of the solvent escapes by the conduit 4 into the atmosphere. These baskets 2 are removed from the chamber 1 at appropriate times and brought into a still 5 (Fig. 2) where the solvent is recovered from the absorbing material in the containers 2. The still comprises a compartment 31 in which the containers 2 find place one above the other. The compartment 31 is closed at the top by a lid 32 which allows the insertion and the removal of the containers 2. Near the top of the compartment 31 enters steam at a pressure of about 0.2 atm. by a pipe 6. The steam controlled by a valve 7 passes through the containers 2 and leaves the compartment 5 by a pipe 8. The pipe 8 enters the upper chamber 12 which is filled with cold water; it forms a coil 9 and is jointed to a tubular connection 20 in which a show glass 21 is inserted. The steam passing through the containers 2 heats the compartment and the containers 2. The solvent in the containers 2 is distilled and a mixture of water vapor and solvent vapors pass through the coil 9 in which condensation takes place. The two-fold distillate thus obtained, the distilled solvent being heavier than the condensed water 15, settles to the bottom 14 of a collecting chamber 13 arranged beneath the condensing chamber 12. The water and the liquid solvent can be drawn off by a known outflow device 17, 18 and 19. The chamber 13 is provided with a window 16 which allows an inspection of the chamber 13. Fresh water is supplied by a pipe 10 to chamber 12 which is provided with an overflow 11. The compartment 31 is connected by a conduit 34 with the discharge side of a centrifugal suction fan 24. In the conduit 34 an electrical heating resistance coil 25 and moreover a valve 23 is arranged. At the top of compartment 31 an outlet pipe 26 with valve 22 is provided.

After the solvent has been distilled the valve 7 is closed and the steam is cut off thereby. The valves 22, 23 are now opened and fresh air heated by the resistance 25 is driven through the compartment. The absorbing material in the containers 2 is dried and the latter made ready to be used again in the apparatus 1.

Several degreasing devices may be connected to one apparatus 1 and the latter may be constructed to receive a plurality of containers 2. All the containers are of the same normalised size and are interchangeable.

What I wish to secure by United States Letters Patent is:

1. In a plant of the character described, the combination of a first chamber containing volatile solvent, a receptacle for the articles to be freed of impurities insertible into said chamber and solvent, a second chamber, a receptacle for material adapted to adsorb vapors of the solvent, said last-named receptacle being removably disposed in the second chamber, means for forcibly conveying vapors of the solvent from the first chamber into the second chamber, a third chamber, means for removably locating the receptacle for vapor adsorbent material in the third chamber, means for supplying steam to said third chamber and receptacle, means for separately condensing the steam and the vapors to furnish water and solvent respectively, and means for supplying heated drying air to said third chamber and receptacle to dry the adsorbent material after it is freed of the solvent and steam.

2. In a plant of the character described, the combination of a first chamber containing volatile solvent, a receptacle for the articles to be freed of impurities insertible into said chamber and solvent, a second chamber, a receptacle for material adapted to adsorb vapors of the solvent, the receptacle for said material being removably disposed in the second chamber, means for forcibly conveying vapors of the solvent from the first chamber into the second chamber, means for discharging gaseous fluid different from solvent vapors from said second chamber, a third chamber, means for removably locating the receptacle for vapor adsorbent material in the third chamber, means for applying steam to said third chamber and receptacle, means located in said third chamber for condensing the mixture of steam and solvent vapors, means for collecting separately the condensate in the form of liquid solvent and water respectively, and means for supplying heated drying air to said third chamber and receptacle to dry the adsorbent material therein after it is freed of the solvent and steam.

3. In a plant of the character described, the combination of a first chamber containing volatile solvent, a receptacle for the articles to be freed of impurities insertible into said chamber and solvent, a second chamber, a plurality of receptacles in superimposed relation, each receptacle holding material adapted to adsorb vapors of the solvent, said receptacle being made of foraminous material, means for forcibly conveying vapors of the solvent from the first chamber into the second chamber and into the foraminous receptacles containing the vapor adsorbent material, a third chamber, means for locating in said third chamber receptacles of vapor adsorbent material and maintaining said receptacles in superimposed relation, means for supplying steam to said third chamber above the top receptacle, means extending from the third chamber below the lowermost receptacle for carrying the mixture of solvent vapors and steam from said third chamber, means located outside the third chamber for condensing the mixture of vapors and steam and for collecting the condensates in superimposed strata, and means for forcibly conveying heated air into said third chamber below the lowermost receptacle in said chamber and for discharging the air from said third chamber above the top of said series of receptacles.

JACQUES ZUCKER.